United States Patent
Murakami et al.

(10) Patent No.: US 7,340,636 B2
(45) Date of Patent: Mar. 4, 2008

(54) ERROR RECOVERY LEVEL OPTIMIZATION IN NETWORK SYSTEM

(75) Inventors: Toshihiko Murakami, Fujisawa (JP); Naoko Iwami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 619 days.

(21) Appl. No.: 11/021,856

(22) Filed: Dec. 21, 2004

(65) Prior Publication Data

US 2006/0107105 A1 May 18, 2006

(30) Foreign Application Priority Data

Oct. 22, 2004 (JP) ............................. 2004-308042

(51) Int. Cl.
*G06F 11/00* (2006.01)
(52) U.S. Cl. ............................................. 714/4; 714/2
(58) Field of Classification Search ................... 714/4, 714/2, 15, 16, 20
See application file for complete search history.

(56) References Cited

U.S. PATENT DOCUMENTS

| | | | |
|---|---|---|---|
| 6,683,883 B1 * | 1/2004 | Czeiger et al. ............. | 370/401 |
| 7,039,827 B2 * | 5/2006 | Meyer et al. ................... | 714/4 |
| 2005/0066046 A1 * | 3/2005 | Chadalapaka ............... | 709/230 |
| 2006/0085665 A1 * | 4/2006 | Knight et al. .................. | 714/2 |

FOREIGN PATENT DOCUMENTS

JP 2004-192305 8/2004

OTHER PUBLICATIONS

Satran et al. "RFC 3720 Internet Small Computer Systems Interface," Network Working Group Request for Comment (RFC) 3720 (Apr. 2004).

Tseng et al. "Internet Storage Name Service iSNS," an Internet Engineering Task Force (IEFT) Internet Draft (Aug. 2004).

* cited by examiner

*Primary Examiner*—Dieu-Minh Le
(74) *Attorney, Agent, or Firm*—Townsend and Townsend and Crew LLP

(57) ABSTRACT

To provide a technique whereby a value of an error recovery level determined in negotiation processing between an initiator and a target can be set to a suitable value that is intended by a manager. A storage system comprises a storage section containing a target module that is connected to an initiator device; and a management section that manages the storage section. The target module carries out negotiation processing with the initiator device so as to determine a value of a first error recovery level. The first error recovery level is determined as the smaller of a value of a second error recovery level of the initiator device and a value of a third error recovery level of the target module. The management section carries out setting processing for allocating the initiator device that is to be connected to the target module to the target module, according to an instruction from a manager. In the setting processing, the value of third error recovery level is notified to the manager.

13 Claims, 13 Drawing Sheets

LUN management table

| Target | Portal | Initiator | IERL | TERL |
|---|---|---|---|---|
| iqn-t-a | Portal a | iqn-i-a | 0 | 0 |
| iqn-t-b | Portal b | iqn-i-b | 1 | 1 |
| iqn-t-c | Portal c | iqn-i-c | 2 | 2 |
| iqn-t-c | Portal d | iqn-i-c | 2 | 2 |

| LUN | LU |
|---|---|
| 0 | 00:00 |
| 1 | 00:01 |
| 2 | 00:02 |

| LUN | LU |
|---|---|
| 0 | 01:00 |
| 1 | 01:01 |

| LUN | LU |
|---|---|
| 0 | 02:00 |
| 1 | 02:01 |
| 2 | 02:02 |
| 3 | 02:03 | iSCSI settings table

| Target | Portal | Initiator | TERL | Header digest | Data digest |
|---|---|---|---|---|---|
| iqn-t-a | Portal a | iqn-i-a | 0 | None | None |
| iqn-t-b | Portal b | iqn-i-b | 1 | Yes | Yes |
| iqn-t-c | Portal c | iqn-i-c | 2 | Yes | Yes |
| iqn-t-c | Portal d | iqn-i-c | 2 | Yes | Yes |

ERROR RECOVERY LEVEL OPTIMIZATION IN NETWORK SYSTEM

CROSS REFERENCE

The present application is based on, and claims priority from, Japanese Application No. 2004-308042 filed Oct. 22, 2004, the disclosure of which is herein incorporated by reference.

BACKGROUND

The present invention relates to technology for a network system.

In recent years, storage area networks (SAN) according to iSCSI protocol have been developed. "iSCSI" is a standard for transferring SCSI commands/data via IP networks. Errors that occur during iSCSI communication between an initiator and a target are recovered by carrying out an error recovery processing therebetween.

A value of the error recovery level specifying the content of the error recovery processing is determined by negotiation processing between the initiator and target. The error recovery level is determined in the negotiation processing as the smaller value of the error recovery level set to the initiator and the error recovery level set to the target.

Conventionally, the correspondence between a target and an initiator that should be connected to that target is set beforehand by the network manager. However, the error recovery level for the target and initiator were not conventionally considered by the manager when setting the correspondence between the target and initiator. Because of this, it was difficult to set the value of the error recovery level determined in negotiation processing to a suitable value that was intended by the manager.

SUMMARY

The present invention solves the above-described problem of conventional technology, and there is need to provide a technique whereby the value of the error recovery level determined in negotiation processing between the initiator and target can be set to a suitable value that is intended by the manager.

At least part of the above and the other related objects is attained by a system of the present invention. The system is a storage system, which comprises a storage section containing a target module that functions as an iSCSI target and is connected to an initiator device functioning as an iSCSI initiator via a first network, and a logical unit that is accessed by the target module; and a management section that manages the storage section. The target module comprises a control module that carries out negotiation processing with the initiator device so as to determine a value of a first error recovery level for specifying contents of error recovery processing for recovering from a communication error between the initiator device and the target module, wherein the first error recovery level is determined as the smaller of a value of a second error recovery level set to the initiator device and a value of a third error recovery level set to the target module. The management section comprises a setting module that carries out setting processing for allocating the initiator device that is to be connected to the target module to the target module, according to an instruction from a manager of the storage system. The setting module comprises a notification module that notifies the manager of the value of the third error recovery level in the setting processing.

In this system, the value of the third recovery level set to the target module is notified to the manager, so if the manager, for example, investigates the value of the second recovery level set to the initiator beforehand, the manager can allocate an initiator device having a suitable value of the second error recovery level to the target module while taking into consideration the value of the third error recovery level. The value of the first error recovery level determined in negotiation processing between the initiator device and the target module can thereby be set to a suitable value that is intended by the manager.

In the above system, it is preferable that the setting module allows the manager to change the value of the third error recovery level in the setting processing.

By employing this arrangement, the manager can change the value of the third error recovery level of the target module to the value intended by the manager, so the value of the first error recovery level determined in negotiation processing can be readily set to a suitable value intended by the manager.

In the above system, it is preferable that the setting module further comprises an acquisition module that acquires the value of the second error recovery level from the initiator device via a second network, and the notification module notifies the manager of the acquired value of the second error recovery level in the setting processing.

By employing this arrangement, the manager can readily ascertain the value of the second error recovery level set to the initiator.

In the above system, it is preferable that the acquisition module acquires function-related information related to a function of the initiator device from the initiator device via the second network, and the notification module notifies the manager of the function-related information.

By employing this arrangement, the manager can readily ascertain the function of the initiator device, so the value of the third error recovery level of the target module can be changed to a suitable value according to the function of the initiator device.

The function-related information may contain information related to a detection performance of communication errors in the initiator device. Also, the function-related information may contain information related to whether a switching program for switching a logical communication path between the initiator device and the target module is present.

In the above system, it is preferable that the notification module notifies the manager of assistance information for assisting the manager in changing the value of the third error recovery level in response to the function-related information.

By employing this arrangement, the manager can readily change the value of the third error recovery level of the target module, taking into consideration the assistance information.

In the above system, the function-related information may contain first information related to a detection performance of communication errors in the initiator device. The notification module, if the first information indicates that the detection performance of the initiator device is relatively low, may notify the manager of the assistance information that encourage the manager to set the value of the third error recovery level to a value smaller than the value of the second error recovery level.

In the above system, the function-related information may contain second information related to whether a switching program for switching a logical communication path between the initiator device and the target module is present. The notification module, if the second information indicates that the switching program is present, may notify the manager of the assistance information that encourage the manager to set the value of the third error recovery level to 0 or 1.

In the above system, the setting module may allow the manager to change the value of the second error recovery level in the setting processing. The setting module may further comprise a supply module that supplies the initiator device with the changed value of the second error recovery level via the second network.

With this arrangement, the manager can change the value of the second error recovery level of the initiator device to the value intended by the manager, so the value of the first error recovery level determined in negotiation processing can be readily set to a suitable value intended by the manager.

It should be noted that the present invention may be actualized by a diversity of applications such as a storage system, a network system including the storage system, a method and a device for managing the storage system, computer programs that attain these methods or functions of these devices, and recording media in which such computer programs are recorded.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention are discussed below based on examples in the following order.
  A. First Embodiment:
    A-1. Arrangement of Network System:
    A-2. Outline of an Error Recovery Level:
    A-3. Detailed Arrangement of Network System:
    A-4. Setting of Correspondence between Target and Initiator:
    A-5. Setting Example of Target Error Recovery Level:
    A-6. Setting Error Recovery Level in Channel Adapter:
    A-7. Determining Error Recovery Level through Negotiation Processing:
    A-8. Modification of the First Embodiment:
  B. Second Embodiment:
    B-1. Modification of the Second Embodiment:

A. First Embodiment

Figure 1:
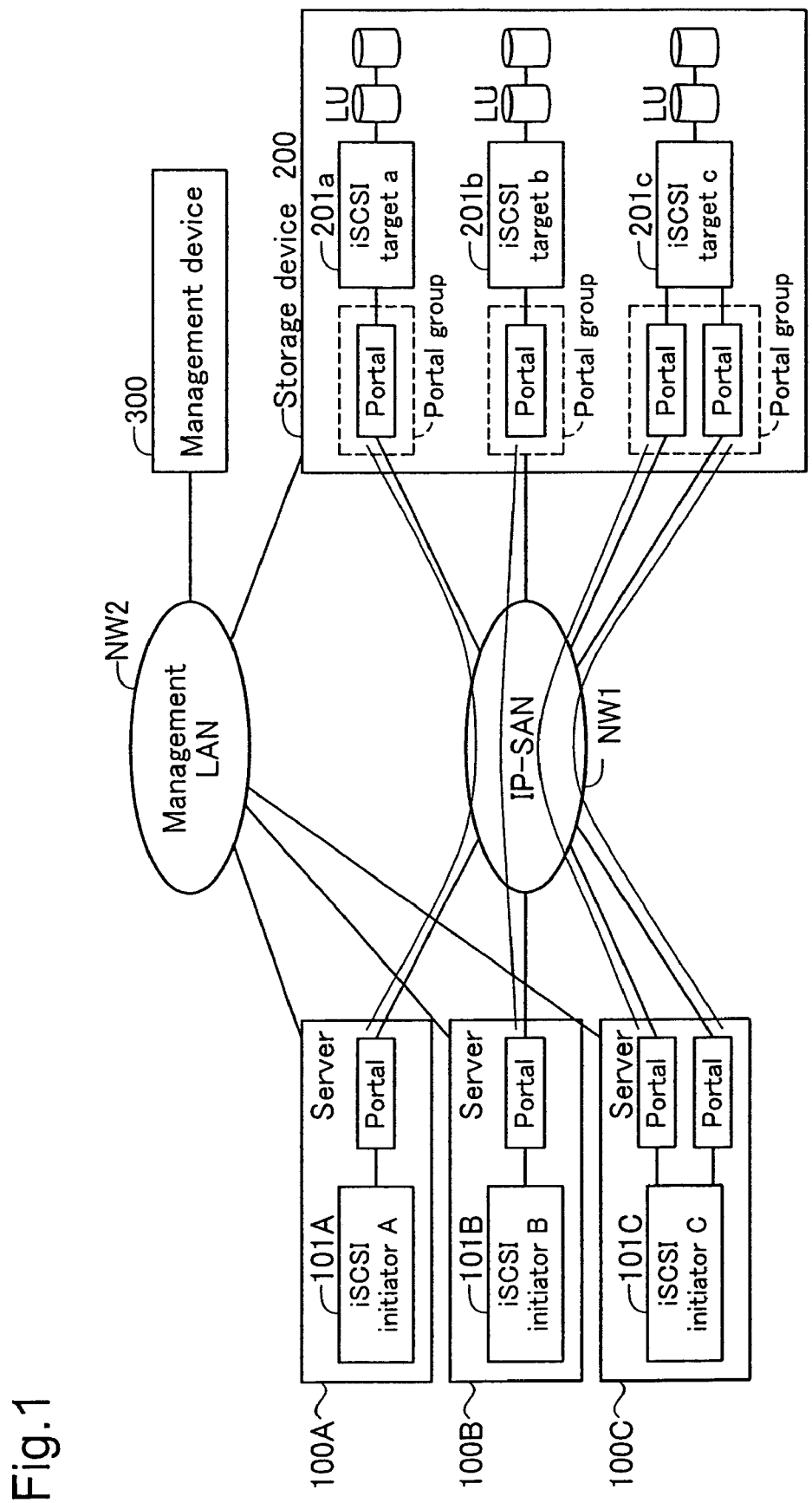
FIG. 1 is an explanatory view showing a simplified arrangement of a network system.

A-1. Arrangement of Network System:

FIG. 1 is an explanatory view showing a simplified arrangement of a network system. The network system contains two networks NW1 and NW2. The first network NW1 is an IP-based storage area network (IP-SAN). The second network NW2 is a local area network for management (management LAN). Three servers 100A-100C and a storage device 200 are connected to the first network NW1. The three servers 100A-100C, the storage device 200, and the management device 300 are connected to the second network NW2.

Each of the servers 100A-100C functions as an iSCSI initiator (hereinafter, referred to as "initiators") 101a-101c. At least one portal is set to correspond to each of the initiators 101a-101c. In FIG. 1, one portal is set to correspond to each of the first and second initiators 101a and 101b, and two portals are set to correspond to the third initiator 101c. An initiator portal is a port that carries out data transfer using TCP and is identified by an IP address.

The storage device 200 functions as a plurality of iSCSI targets (hereinafter, referred to as "targets"). In FIG. 1, three targets 201a-201c are illustrated. A portal group containing at least one portal is set to correspond to each of the targets 201a-201c. A portal group is an identifier showing logical coupling between iSCSI target and portal(s). In FIG. 1, the portal groups corresponding to the first and second targets 201a, 201b contain one portal respectively, and the portal group corresponding to the third target 201c contains two portals. The target portals are identified by an IP address and TCP port number.

In FIG. 1, the first initiator 101a and the first target 201a are connected via a logical communication path called an iSCSI session. Similarly, the second initiator 101b is connected to the second target 201b, and the third initiator 101c is connected to the third target 201c. An iSCSI session is composed of at least one TCP connection. In FIG. 1, the session between the first initiator 101a and the first target 201a, and the session between the second initiator 101b and the second target 201b are composed of one TCP connection, respectively. The session between the third initiator 101c and the third target 201c is composed of two TCP connections.

The management device 300 has a function for managing the connection between the servers 100A-100C and the storage device 200.

A-2. Outline of an Error Recovery Level:

Communication according to iSCSI protocol is carried out between an initiator and a target. Error recovery processing is carried out to recover from iSCSI communication errors between the initiator and target. The content of this error recovery processing is specified by the error recovery level. The error recovery level is determined in negotiation processing. The negotiation processing is carried out between the initiator and target when the initiator is connecting to the target. In iSCSI, three error recovery levels are provided.

a) Error Recovery Level 2

If the error recovery level is "2", connection recovery can be carried out. In the connection recovery, a connection is reestablished, or a write or read command is restarted.

b) Error Recovery Level 1

If the error recovery level is "1", within-connection recovery and within-command recovery can be carried out. In the within-connection recovery, a lost command is retransmitted without reestablishing a connection. In the within command recovery, a command in which a CRC (Cyclic Redundancy Check) error was found is retransmitted without reestablishing a connection.

c) Error Recovery Level 0

If the error recovery level is "0", a session recovery is carried out. In the session recovery, all connection(s) are closed, and new connection(s) are reestablished to start a new session.

A detailed description of error recovery processing at each error recovery level is given in RFC (Request for Comments) 3720 managed by the IETF (Internet Engineering Task Force).

In the negotiation processing, the error recovery level is determined as the smaller value of a value of the error recovery level set to the initiator and a value of the error recovery level set to the target. Also, the error recovery processing is carried out between the initiator and target according to the value of the error recovery level determined in the negotiation processing.

If the error recovery level decided in the negotiation processing is "2", the connection recovery corresponding to the error recovery level "2" as well as the other recoveries (within-connection recovery, within-command recovery, and session recovery) corresponding to the lower error recovery levels "1" and "0" may be carried out. Similarly, if the error recovery level decided in the negotiation processing is "1", the within-connection recovery and within-command recovery corresponding to the error recovery level "1" as well as the session recovery corresponding to the lower error recovery level "0" may be carried out. If the error recovery level decided in the negotiation processing is "0", only the session recovery corresponding to the error recovery level "0" may be carried out.

As described above, if the error recovery level decided by the negotiation processing is "2" or "1", a variety of error recovery processing may be carried out. However, the session recovery corresponding to the error recovery level "0" is carried out, if communication errors are not recovered by carrying out a recovery corresponds to a higher error recovery level.

As described above, the target and initiator error recovery levels were not conventionally considered when the manager set the correspondence between the target and initiator. Because of this, it was difficult to set the value of the error recovery level determined in the negotiation processing between the initiator and target to a suitable value intended by the manager. For example, if an initiator selected by the manager has an error recovery level of "2" and a target selected by the manager has an error recovery level of "2", the error recovery level winds up being determined as "2" in the negotiation processing, even though the error recovery level intended by the manager is "1".

The present embodiment has been devised such as to solve the above-mentioned problems. Specifically, in the present embodiment, the manager can recognize the value of the error recovery level of the target and change the value of the error recovery level of the target when setting the correspondence.

In the below description, the error recovery level of the initiator is simply referred to as the "initiator level", and the error recovery level of target is simply referred to as the "target level". Also, the values of the error recovery levels set beforehand to the initiator and the target are referred to as the "initial values", and the values set to the initiator and the target which are utilized during negotiation processing are referred to as the "setting value". Further, the value of the error recovery level determined in the negotiation processing is referred to as the "determined value".

In this embodiment, the initiator level is not changed, so the setting value of the initiator level is the same as the initial value. On the other hand, the target level can be changed, so the setting value of the target level can differ from the initial value.

Figure 2:
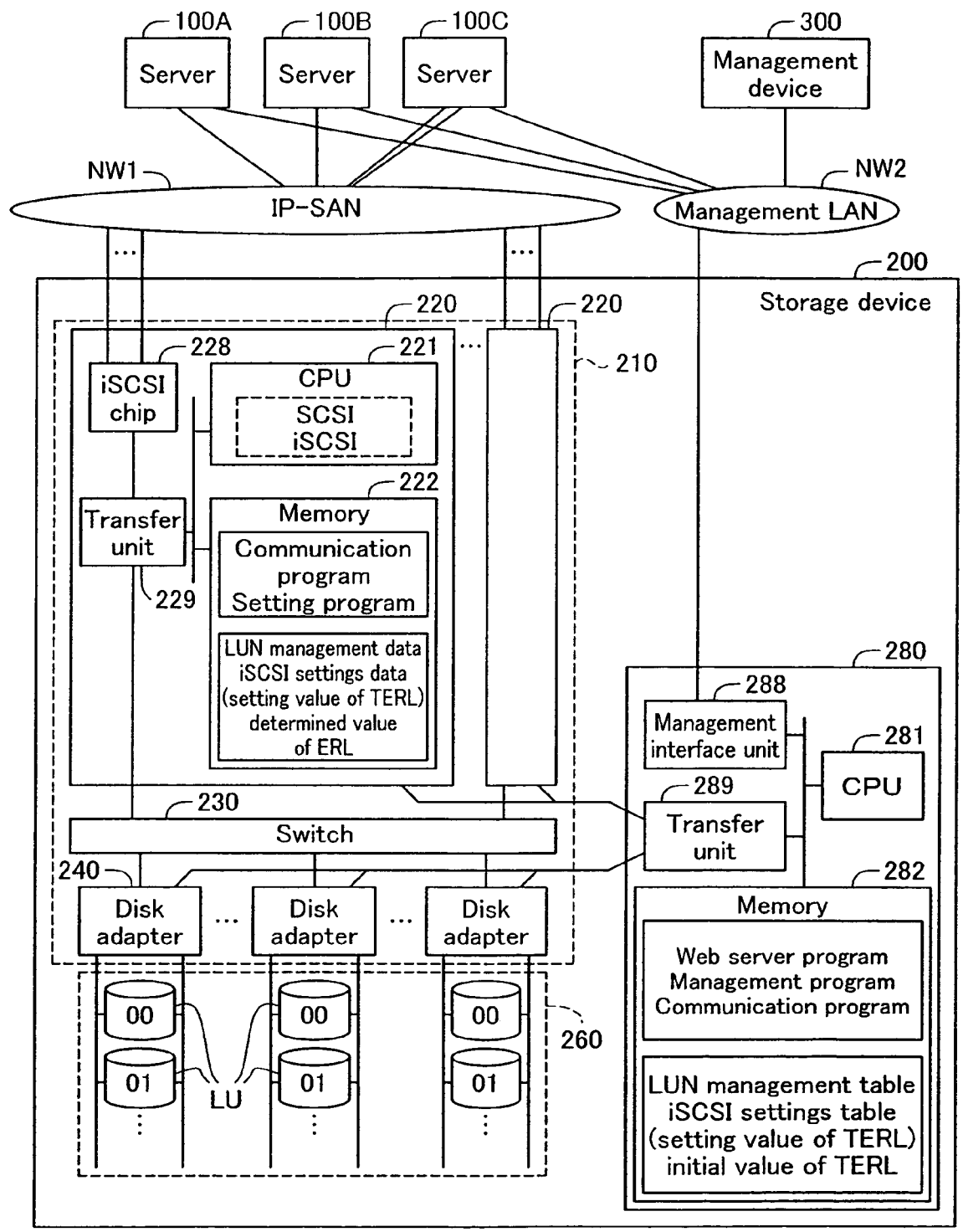
FIG. 2 is an explanatory view showing a detailed arrangement of a storage device 200 shown in FIG. 1.

A-3. Detailed Arrangement of Network System:

FIG. 2 is an explanatory view showing a detailed arrangement of the storage device 200 shown in FIG. 1. As illustrated, the storage device 200 comprises a disk control module 210, a disk drive module 260, and a storage management module 280. The disk control module 210 comprises a plurality of channel adapters 220, a switch 230, and a plurality of disk adapters 240.

The disk drive module 260 includes a plurality of hard disks, divided into a plurality of logical units (storage regions) LUs. Each logical unit LU may be a storage region composed of one or more hard disks, or a storage region composed of a part of one hard disk. Also, the size (capacity) of each logical unit may be the same or different. The plurality of logical units are divided into a plurality of groups (logical unit groups), and each logical unit group contains one or more logical units.

Each disk adapter 240 is provided to correspond to one logical unit group. The disk adapter carries out data read and write processing for the logical unit LU contained in the corresponding logical unit group according to an instruction given by an arbitrary channel adapter 220.

The switch 230 has a function for sending data between an arbitrary channel adapter 220 and an arbitrary disk adapter 240. In this embodiment, the switch is equipped with a cache memory for temporarily storing data to be sent.

Each channel adapter 220 functions as a target. The channel adapter 220 comprises a CPU 221, a memory 222, an iSCSI chip 228, and a transfer unit 229. The memory 222 stores a communication program and a setting program. Also, the memory 222 stores LUN (Logical Unit Number) management data, iSCSI settings data, and a determined value of the error recovery level (ERL) determined in the negotiation processing. Note that the iSCSI settings data contains the setting value of the target error recovery level (TERL). The communication program has a function for receiving LUN management data and iSCSI settings data from the storage management module 280 and storing it in the memory 222. The setting program has a function to carry out various settings such that the channel adapter operates according to the LUN management data and the iSCSI settings data. The iSCSI chip 228 is an interface for communicating with the server (initiator). Note that the iSCSI chip carries out processing for TCP/IP layer and iSCSI layer. The transfer unit 229 is an interface for the channel adapter to communicate with each component in the storage device.

The function of the channel adapter 220 is realized by the CPU 221 carrying out various programs. In FIG. 2, an iSCSI hierarchy model is shown in the CPU 221. In the channel adapter, processing for the SCSI layer and iSCSI layer is carried out using a driver (software). As will be understood from this description, in this embodiment, processing for iSCSI layer is carried out by software (the driver) and hardware (the iSCSI chip 228). The channel adapter 220 carries out negotiation processing with the server using the iSCSI settings data. Also, the channel adapter 220 instructs the disk adapter 240 to carry out reading and writing of data to one of the logical units LUs contained in the disk drive module 260 using the LUN management data.

The storage management module 280 comprises a CPU 281, a memory 282, a management interface unit 288, and a transfer unit 289. The memory 282 stores a communication program, a management program, and a web server program. The memory 282 also stores a LUN management table containing a plurality of LUN management data, an iSCSI settings table containing a plurality of iSCSI settings data, and initial values for each target error recovery level (TERL). LUN management data and iSCSI settings data are prepared for each target (channel adapter). The iSCSI settings table contains setting values for each target error recovery level (TERL). Also, the initial value for the target error recovery levels (TERL) is common for all the targets. The communication program has a function to send to each of the channel adapters 220 corresponding LUN management data and iSCSI settings data. The management program has a function for setting a correspondence between the target and the initiator and creating a LUN management table and an iSCSI settings table. In particular, it is possible in the present embodiment to set the target error recovery level when the management program sets the correspondence between the target and the initiator. The web server program has a function to provide management screens (described later) created by the management program to a management device 300. The management interface unit 288 is an interface for communicating with the management device 300 through the second network NW2. The transfer unit 289 is an interface for communicating with each component in the storage device.

Figure 3:
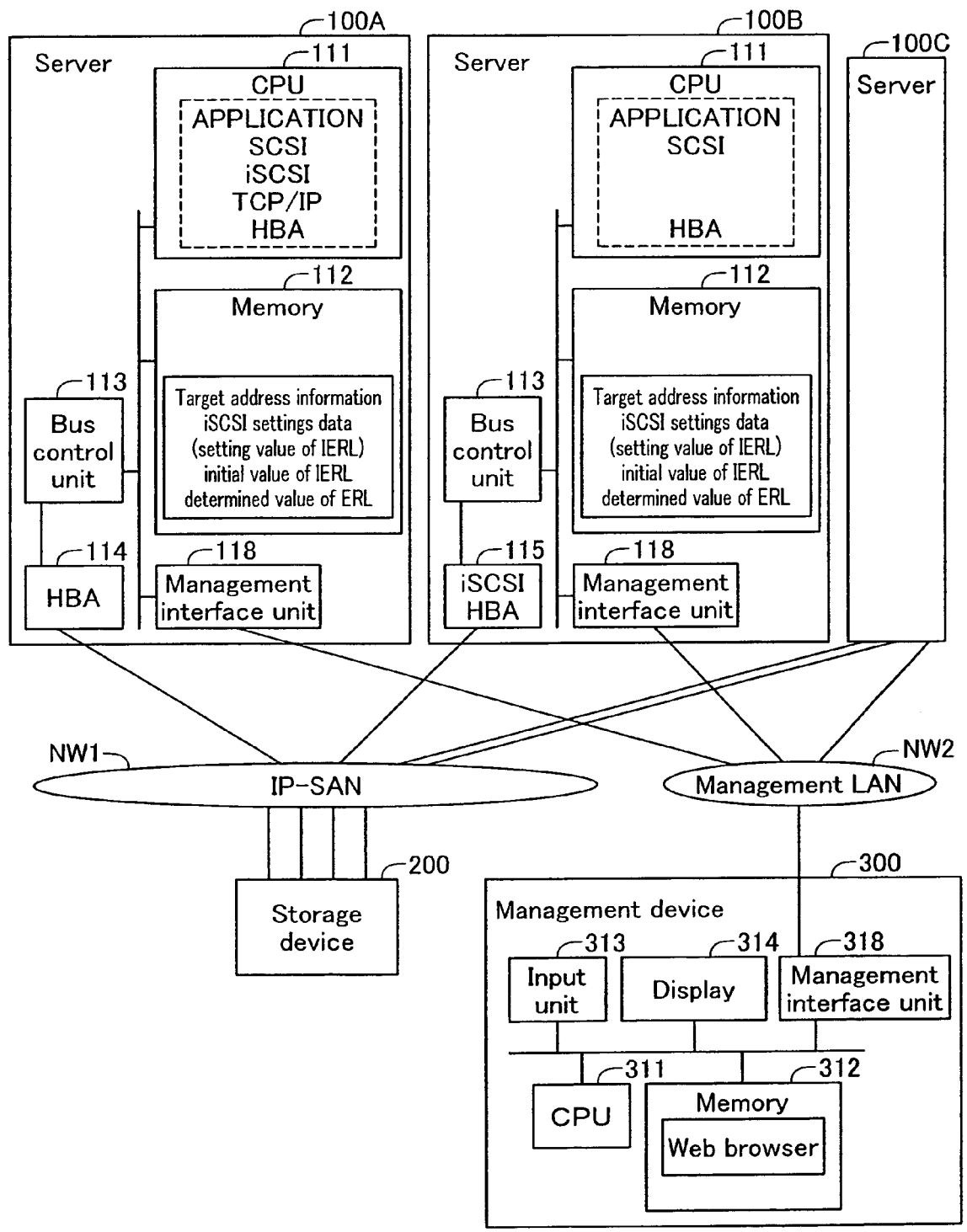
FIG. 3 is an explanatory view showing a detailed arrangement of servers 100A-100C and a management device 300 shown in FIG. 1.

FIG. 3 is an explanatory view showing a detailed arrangement of the servers 100A-100C and the management device 300 shown in FIG. 1.

Each server 100A-100C functions as an initiator. As illustrated, the first server 100A comprises a CPU 111, a memory 112, a bus control unit 113, a host bus adapter (HBA) 114, and a management interface unit 118. The memory 112 stores target address information for specifying the target to be connected, iSCSI settings data, the initial value of the initiator error recovery level (IERL), and the determined value of the error recovery level (ERL) decided in negotiation processing. The iSCSI settings data contains the setting value (the same as the initial value) for the initiator error recovery level (IERL). The bus control unit 113 controls transfer of data between the each component of the server and the HBA 114. The HBA 114 is an interface for communicating with the storage device 200 through the first network NW1. The management interface unit 118 is an interface for communicating with the management device 300 through the second network NW2.

The second and third servers 100B and 100C are similar to the first server 100A, but comprise an iSCSI HBA 115 instead of the HBA 114. In FIG. 2, the iSCSI hierarchy model is depicted in the CPU 111. As will be understood from this model, processing for iSCSI layer and TCP/IP layer is effected by software (a driver) in the first server 100A, but in the second and third servers 100B and 100C, it is effected by hardware (the iSCSI HBA 215). In this manner, it is possible to alleviate the load on the CPU 111 by employing an iSCSI HBA.

The management device 300 comprises a CPU 311, a memory 312, an input unit 313, a display 314, and a management interface unit 318. The memory 312 stores a web browser. The manager gives an instruction through the web browser for the management program stored in the storage management module 280 (FIG. 2) to be executed. A management screen provided by the management program appears in the web browser window displayed in the display 314. The manager can set the correspondence between the target and initiator using the management screen. In particular, as described above, the manager can set the target (channel adapter) error recovery level to a desired value using the management screen when setting the correspondence in the present embodiment.

It should be noted that, each server 100A-100C in this embodiment corresponds to an initiator device in the present invention. Also, the storage device 200 and the management device 300 correspond to a storage system in the present invention. In particular, the disk control module 210 and the disk drive module 260 in the storage device 200 correspond to a storage section, and the disk adapter 220 corresponds to a target module. Also, the storage management module 280 in the storage device 200 and the management device 300 correspond to a management section. Further, the storage management module 280 corresponds to a setting module in the present invention, and the storage management module 280 and the management device 300 correspond to a notification module.

Figure 4:
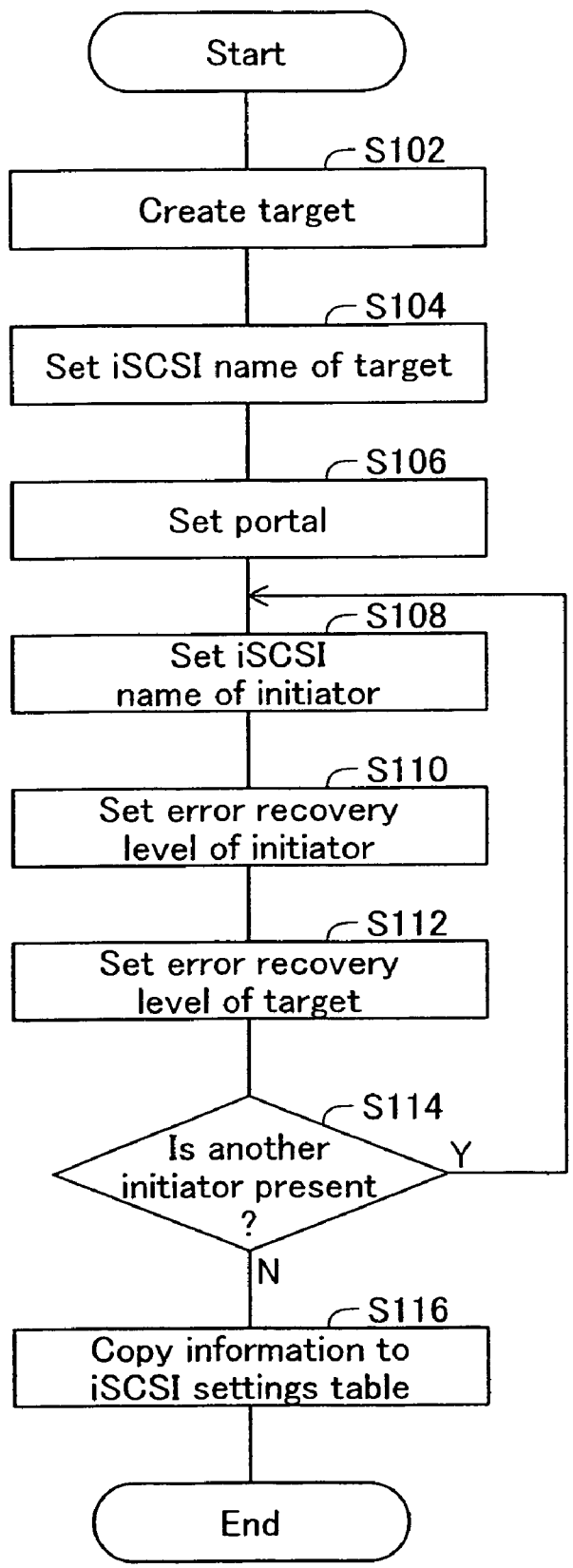
FIG. 4 is a flowchart showing procedure for setting correspondence between target and initiator.

A-4. Setting of Correspondence between Target and Initiator:

FIG. 4 is a flowchart showing the procedure for setting the correspondence between the target and the initiator. The processing shown in FIG. 4 is executed by the management program in the storage management module 280 (FIG. 2).

Figures 5, 6:
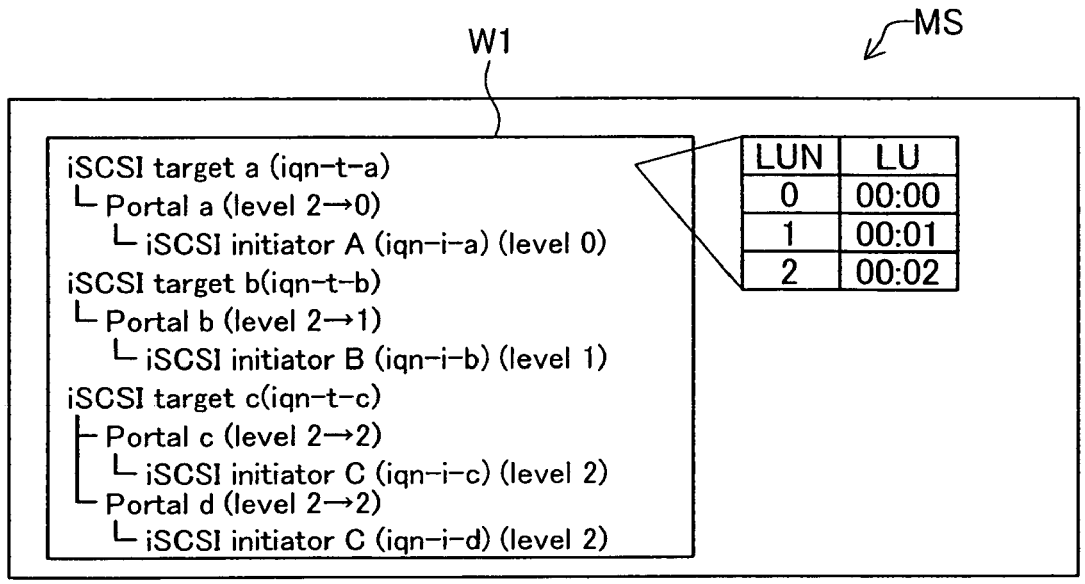
FIG. 5 is an explanatory view showing a management screen MS displayed when setting the correspondence between the target and initiator.
FIG. 6 is an explanatory view showing contents of a LUN management table.

FIG. 5 is an explanatory view showing a management screen MS displayed when setting the correspondence between the target and initiator. The management screen MS contains a setting field W1 for the manager to set the correspondence. In FIG. 5, the correspondence is already set. The manager uses the management screen to cause the management program to set the correspondence between the target and the initiator. When the correspondence is set, a LUN management table is created in the memory 282 (FIG. 2) by the management program.

FIG. 6 is an explanatory view showing the contents of the LUN management table. As illustrated, the LUN management table contains target iSCSI names, target portals, initiator iSCSI names, initiator error recovery level (IERL)

setting values (which are the same as the initial values), target error recovery level (TERL) setting values (which may be different from the initial values), and logical unit number (LUN) information.

Bellow, the processing in FIG. 4 is described while referring to FIGS. 5 and 6. In the present embodiment, suppose that the initial values of the error recovery levels are previously set to "2" for all the targets in the storage device 200. Also, suppose that the initial values of the error recovery levels are previously set to "0", "1", and "2" for the three initiators, respectively. Further, suppose that the initial values of the initiator level are investigated beforehand by the manager in this embodiment.

In step S102 (FIG. 4), a target is created. Specifically, the management program selects a logical unit LU that is to be allocated to a specific target (channel adapter), according to an instruction provided by the manager through the management screen. In FIG. 5, three logical units "00:00", "00:01", and "00:02" have been allocated to the specific target "a". For example, "00:00" indicates the first logical unit "00" contained in the first logical unit group "00" corresponding to the first disk adapter 240 (FIG. 2). Next, the management program provides the logical unit numbers (LUN) "0", 37 1" and "2" to the selected logical units "00:00", "00:01", and "00:02". Then, the management program registers the LUN information for the specific target "a" to the LUN management table as shown in FIG. 6.

In step S104 (FIG. 4), an iSCSI name of the target is set. Specifically, the management program registers an iSCSI name provided by the manager in the LUN management table. The iSCSI name "iqn-t-a" is set for the specific target "a" in FIGS. 5 and 6.

In step S106, a portal of the target side is set. Specifically, the management program registers an IP address and a TCP port number for identifying the portal provided by the manager in the LUN management table. The portal information "portal a" corresponding to the specific target "a" is set in FIGS. 5 and 6.

Note that, in step S106, a plurality of pieces of portal information are set if a plurality of portals corresponding to the target are present.

When the portal information is set as described above, the management program reads a target level initial value from the memory 282 (FIG. 2) and displays it on the management screen MS. In the management screen in FIG. 5, the initial value "2" of the error recovery level for the specific target "a" is displayed.

In step S108, an initiator that should be connected to the target is set. Specifically, the management program registers an iSCSI name of the initiator provided by the manager in the LUN management table. The iSCSI name "iqn-i-a" of the specific initiator "A" is set for the specific target "a" in FIGS. 5 and 6.

In step S110, an error recovery level for the initiator is set. Specifically, the management program registers the initial value of the initiator error recovery level provided by the manager in the LUN management table as the setting value. As described above, the initial value of the initiator level is investigated beforehand by the manager. The setting value of the error recovery level (IERL) for the specific initiator "A" is set to "0" in FIGS. 5 and 6.

In step S112, a target error recovery level is set. Specifically, the management program registers the setting value of the target error recovery level provided by the manager in the LUN management table. As described above, the initial value of target level and the setting value (initial value) of initiator level are displayed in the management screen MS.

The manager can thus refer to two values and change the value of target level to the desired value.

In the first setting example, if the initial value of target level is the same as or higher than the initial value of initiator level, the manager changes the target level, setting it to the same value as the initial value of initiator level. In FIGS. 5 and 6, the initial value "2" of the error recovery level (TERL) for the specific target "a" is larger than the initial value "0" of the error recovery level (IERL) for the specific initiator "A", so the setting value of the error recovery level (TERL) for the specific target "a" is set to "0", which is different from its initial value "2". Other setting examples are given later.

In step S114, the management program inquires of the manager through the management screen whether another initiator that should be connected to a target is present. If another initiator is present, the processing in steps S108-S112 is repeated. If another initiator is not present, the processing proceeds to step S116.

In step S116, the management program copies the information registered in the LUN management table to the iSCSI settings table.

Figures 7, 8:
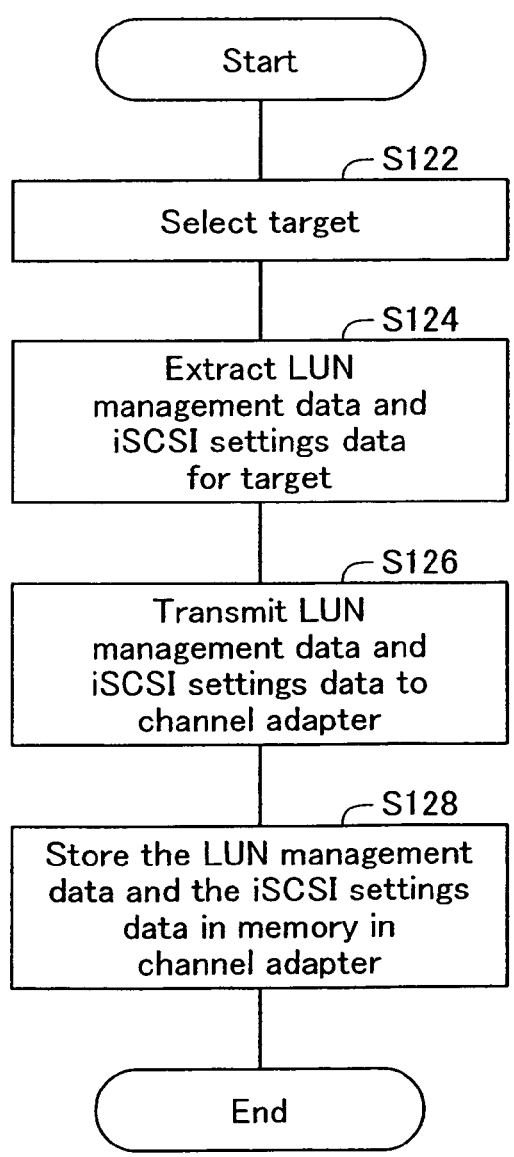
FIG. 7 is an explanatory view showing contents of an iSCSI settings table.
FIG. 8 is a flowchart showing procedure for setting LUN management data and iSCSI settings data in a channel adapter.

FIG. 7 is an explanatory view showing the contents of the iSCSI settings table. As illustrated, the iSCSI settings table contains target iSCSI names, target portals, initiator iSCSI names, and setting values for target error recovery levels (TERL). In this embodiment, in step S116, a variety of information registered in the LUN management table is bulk copied in the iSCSI settings table, but instead of this, information in the iSCSI settings table may be successively copied as information is registered to the management table in the steps of FIG. 4.

As illustrated, a variety of information used when the target communicates with the initiator (for example, whether a header digest for protecting the header integrity is present, whether a data digest for protecting the data integrity is present, and the like) is also contained in the iSCSI settings table. The other variety of information mentioned above is prepared beforehand by the storage management module 280, though the manager can change the contents of that information.

By executing the processing in FIG. 4 repeatedly, correspondences for a plurality of sets of target and initiator can be set.

A-5. Setting Example of Target Error Recovery Level:

In the first setting example of step S112 in FIG. 4, the target level is changed to the same value as the initial value of the initiator level. However, the setting value of the target level is ordinarily set to a different value from the initial value of the initiator level, taking into account the function of the initiator.

A-5-1. Second Setting Example:

If there is a difference in the error checking performance between the initiator and the target, communication may be obstructed. For example, if the error checking performance of the initiator is high, but the error checking performance of the target is low, or if the error checking performance of the initiator is low, but the error checking performance of the target is high, communication may be obstructed. Normally, the error checking performance of the target is high, so in actuality, communication will be obstructed if the error checking performance of the initiator is low.

Specifically, if the initiator has a CRC (Cyclic Redundancy Check) error checking function with an error recovery level "1", there is a case where the CRC error checking function of the initiator is carried out by the software, and a case where the CRC error checking function of the initiator is carried out by the hardware. For example, for the first server 100A shown in FIG. 3, the CRC error checking function is realized by the software (an iSCSI driver), and for the second server 100B, the CRC error checking function is realized by the hardware (iSCSI HBA 115). If the CRC error checking function of the initiator is carried out by the software, there is a difference in the error checking performance (that is, the error checking rate) between the initiator and target, communication may be obstructed.

To resolve the above-mentioned problem, in the second setting example, the manager sets the setting value of target level based on the error checking performance of the initiator.

The manager investigates beforehand whether the initiator error checking function is realized by the software or the hardware. For example, the manager investigates beforehand whether the initiator comprises an iSCSI HBA. Then, the manager sets the target error recovery level according to the initiator error checking performance.

Specifically, if the initial value of the initiator level is "1" and the error checking function of the initiator is carried out by the software, the manager changes the target level from the initial value "2" to a value "0", smaller than the initial value "1" of the initiator level. Also, if the setting value (initial value) of the initiator level is "1" and the error checking function of the initiator is carried out by the hardware, the manager changes the target level from its initial value "2" to the same value "1" as the initial value of the initiator level.

The error recovery level is thereby set to a value suited to the initiator performance in the negotiation processing between the initiator and target, solving the obstruction in communication.

A-5-2. Third Setting Example:

In iSCSI, a plurality of logical communication paths can be used in the iSCSI layer. If the manager determines that it is necessary to use a redundant path (a plurality of logical paths) between the initiator and target, the redundant path can be set when setting the correspondence between the initiator and target in the processing of FIG. 4. For example, a redundant path is set between an initiator "C" and a target "c" in FIG. 5. The redundant path is used normally in the case where the determined value of the error recovery level to be determined in the negotiation processing between the initiator and target is "2".

A redundant path may be used, if the server (initiator) includes a path switching program for switching paths. The path switching program uses a redundant path at the SCSI layer.

However, if the server includes the path switching program, the number of paths may grow excessively. That is because the path redundancy at the SCSI layer realized by the path switching program and the path redundancy at the iSCSI layer overlap.

To solve the above-mentioned problem, in the third setting example, the manager sets the setting value of the target level based on whether a path switching program is present or not.

The manager investigates beforehand whether the server includes a path switching program. Then the manager sets the target error recovery level according to whether a path switching program is present.

Specifically, if the initial value of the initiator level is "2" and the server includes a path switching program, the manager changes the target level from its initial value "2" to the value "1" or "0", lower than the initial value "2" of the initiator level. If the initial value of the initiator level is "2" is and the server does not include a path switching program, the manager sets the target level to "2", the same as its initial value "2".

In the negotiation processing between the initiator and the target, the error recovery level is thereby determined to a value depending on whether a path switching program is present. As a result, it is possible to prevent the number of paths from increasing excessively and the load on the CPU from increasing excessively.

As described in the second and third setting examples, in step S112 in FIG. 4, it is generally favorable to set the setting value of the target level according to the function of the initiator.

A-6. Setting Error Recovery Level in Channel Adapter:

When a LUN management table and an iSCSI settings table are prepared in the memory 282 (FIG. 2) of the storage management module 280 according to the processing of FIG. 4, the LUN management data and the iSCSI settings data are set in the memory 222 of the channel adapter 220. Note that the LUN management data means data corresponding to one target (channel adapter). Also, the iSCSI settings data means data corresponding to one target (channel adapter).

FIG. 8 is a flowchart showing the procedure for setting LUN management data and iSCSI settings data in a channel adapter.

In step S122, the management program in the storage management module 280 (FIG. 2) selects a target (channel adapter) that is to be supplied with the LUN management data and the iSCSI settings data. The selected target is a new target created in FIG. 4.

In step S124, the management program extracts LUN management data corresponding to the selected target from the LUN management table (FIG. 6), and extracts iSCSI settings data corresponding to the selected target from the iSCSI settings table (FIG. 7).

In step S126, the communication program in the storage management module 280 (FIG. 2) transmits the LUN management data and iSCSI settings data to the selected target (channel adapter 220).

In step S128, the communication program in the channel adapter 220 (FIG. 2) receives the LUN management data and the iSCSI settings data. The setting program stores the LUN management data and the iSCSI settings data in the memory 222, and makes various settings such that the channel adapter operates according to the LUN management data and the iSCSI settings data.

When the iSCSI settings data is set in the channel adapter 220, the target (channel adapter) allows access only from the initiator having the iSCSI name contained in the iSCSI settings data, and negotiation processing with the initiator can be carried out. iSCSI communication is thereby realized between the target and the initiator. Also, when the LUN management data is set in the channel adapter, the target (channel adapter) can carry out the reading and writing of data for the specific logical unit specified by the initiator. The specific logical unit is specified by the initiator using the logical unit number (LUN).

By the way, in order for the initiator to connect to the target, information (target address information) for specifying the target needs to be set in the initiator. In this embodiment, the management device 300 acquires the target address information (iSCSI name and portal) associated with each initiator (server) from the storage management module 280 (more specifically, the LUN management table), and supplies the target address information to each initiator (server) through the second network NW2. Each initiator stores target address information in the memory 112. The initiator can thereby access the target, which was associated with the initiator in the processing of FIG. 4.

Figure 9:
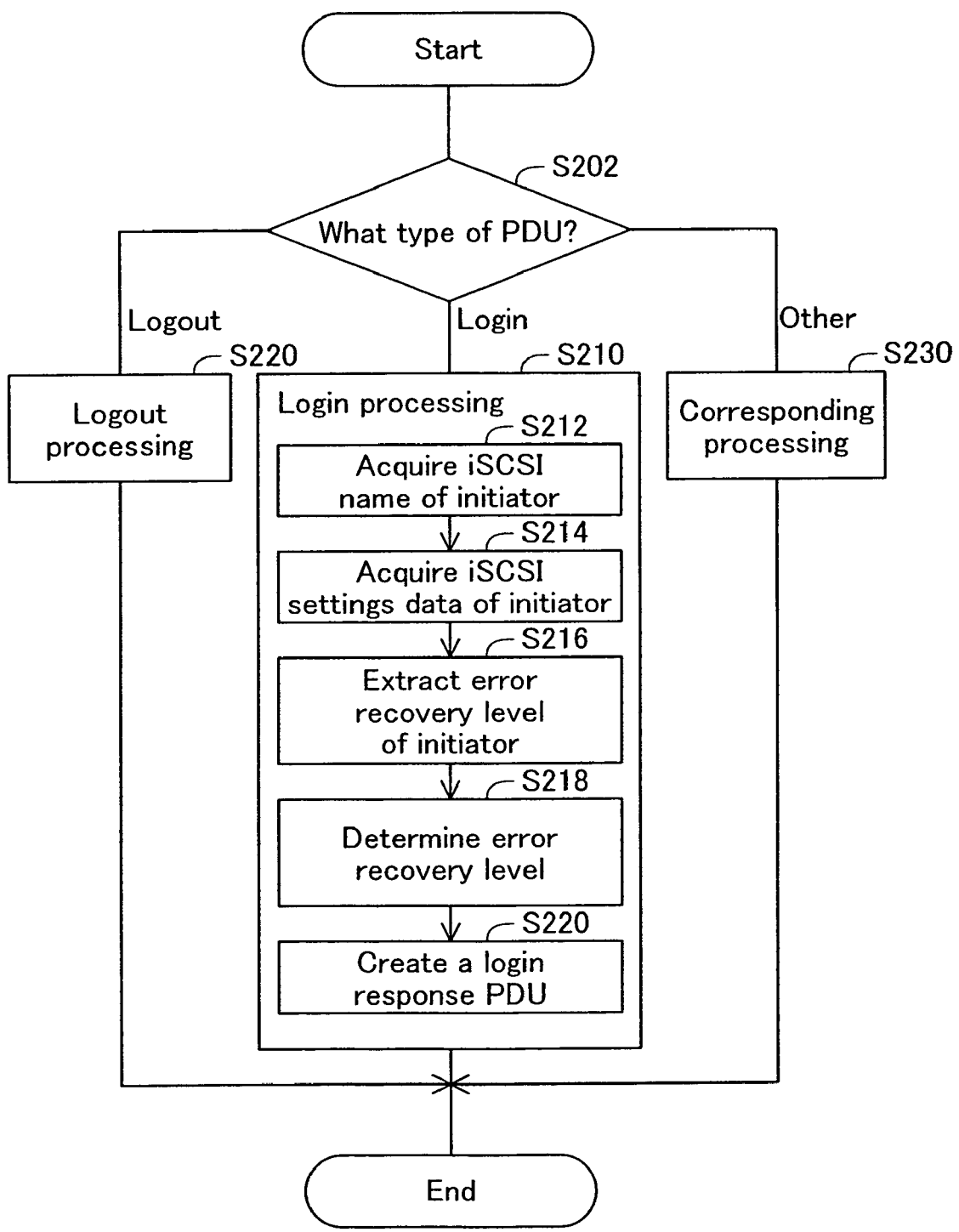
FIG. 9 is a flowchart showing procedure for target processing during iSCSI communication between the initiator and target.

A-7. Determining Error Recovery Level through Negotiation Processing:

FIG. 9 is a flowchart showing the procedure for target processing during iSCSI communication between the initiator and the target. The target processing shown in FIG. 9 is carried out by the iSCSI driver and the iSCSI chip 228 in the channel adapter 220 (FIG. 2). Note that The initiator processing is carried out by the iSCSI driver or the iSCSI HBA 115 in the server (FIG. 3).

In step S202, the type of PDU (protocol data unit) provided by the initiator is determined.

If the type of PDU is a login PDU, processing proceeds to step S210 and login processing is carried out. If the type of PDU is a logout PDU, processing proceeds to step S220 and logout processing is carried out. If the type of PDU is other PDU, processing proceeds to step S230, and the corresponding processing is carried out. The processing in steps S220 and S230 is similar to conventional processing, so its explanation is omitted.

In the login processing of step S210, negotiation processing between the initiator and the target is carried out. In the negotiation processing, the value of the error recovery level is determined.

In step S212, the target acquires the iSCSI name sent by the initiator. At that time, the target determines whether the acquired iSCSI name of initiator matches the iSCSI name of the initiator contained in the iSCSI settings data set in FIG. 8. If they match, the target allows access from the initiator.

In step S214, the target acquires iSCSI settings data for initiator sent by the initiator. The iSCSI settings data for initiator corresponds to the iSCSI settings data for target (channel adapter) and is stored in the memory 112 (FIG. 3) of the initiator (server). The iSCSI settings data for the initiator contains the setting value of initiator level (which is the same as the initial value)

In step S216, the target extracts the initiator level setting value from the acquired iSCSI settings data for the initiator.

In step S218, the target determines the smaller of the initiator level setting value and the target level setting value as the error recovery level.

Then, the target stores the determined value of the error recovery level in the memory 222 (FIG. 2).

In step S220, the target creates a login response PDU and transmits it to the initiator. Specifically, the target inserts a variety of information (in detail, information contained in the iSCSI settings data for the target) including the determined value of the error recovery level into a login response PDU. As a result, a complete login response PDU is created.

The initiator receives the login response PDU, extracts the determined value of the error recovery level from the login response PDU, and stores it in the memory 112 (FIG. 3).

In this manner, the determined value of the error recovery level determined in the negotiation processing is set to both the target and the initiator. As a result, error recovery processing specified by the determined value of the error recovery level can be carried out between the initiator and the target.

As described above, in this embodiment, the manager can change the value of the target error recovery level to a value intended by the manager, so the value of the error recovery level determined in the negotiation processing can be easily set to a suitable value intended by the manager.

Figure 10:
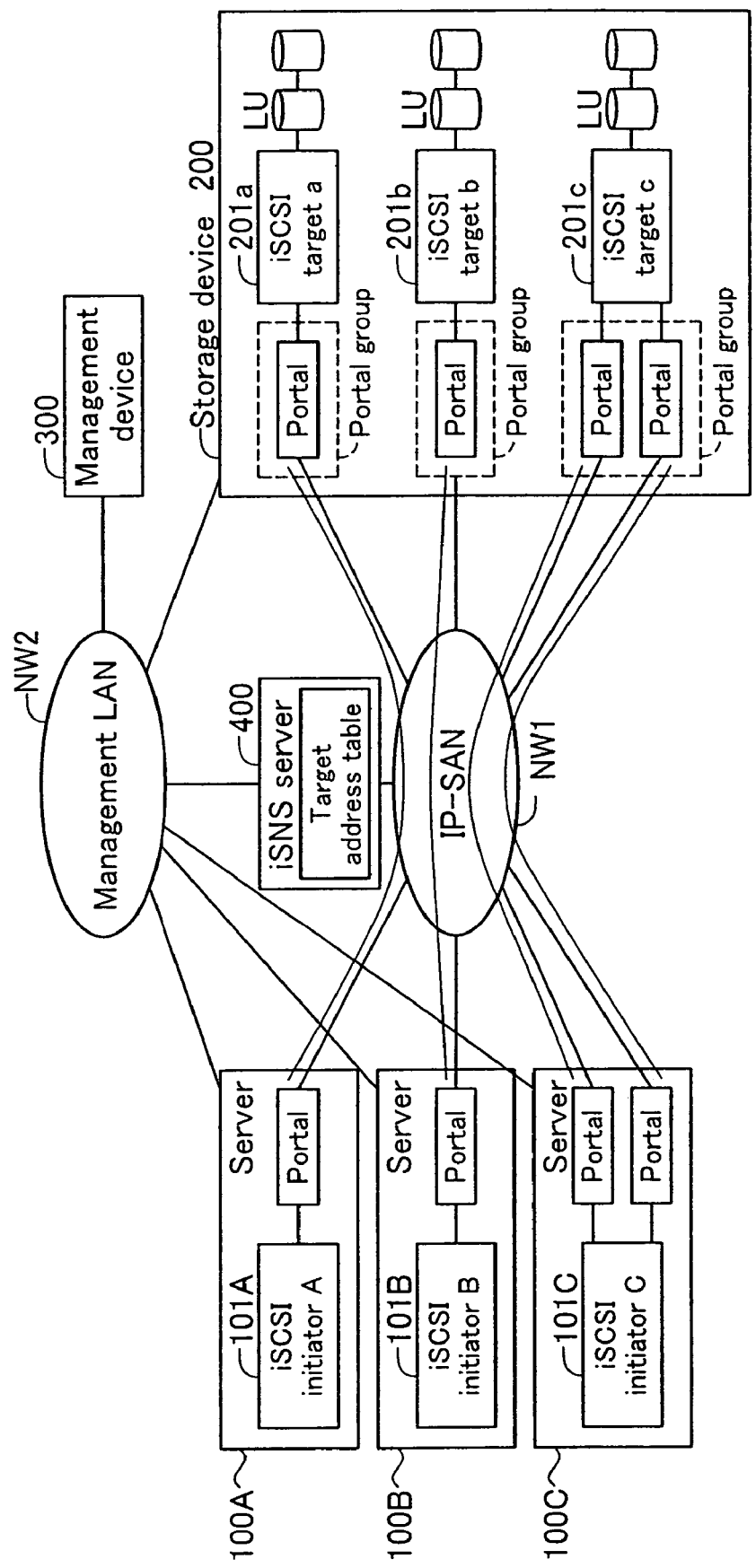
FIG. 10 is an explanatory view showing a simplified arrangement of a network system in a modified example of the first embodiment.

A-8. Modification of the First Embodiment:

FIG. 10 is an explanatory view showing a simplified arrangement of a network system in a modified example of the first embodiment. FIG. 10 is similar to FIG. 1, except an iSNS (Internet Storage Name Service) server 400 is added in FIG. 10. The iSNS server is connected to the first and second networks NW1 and NW2.

The iSNS server 400 includes a target address table for specifying the target that each initiator (server) is to connect to. The iSCSI name of each initiator, and the address information of the target that each initiator is to connect to are registered in the target address table.

The target address table is supplied from the management device 300. Specifically, the management device 300 acquires the target address information (iSCSI name and portal information) associated with each initiator (server) from the storage management module 280 (more specifically, the LUN management table), and creates a target address table. Then, the management device 300 supplies the target address table to the iSNS server via the second network NW2.

When the iSNS server 400 is informed of the initiator name by the initiator, the iSNS server 400 refers to the target address table and reads out the target address information corresponding to that initiator name. Then, the iSNS server transmits the read-out target address information to the initiator. The initiator can thereby access a target specified with the received target address information.

By employing an iSNS server, a resultant advantage is that the management device 300 does not need to provide the target address information to each server individually.

In this modified example, the management device 300 sets the target address information for specifying the target that the initiator is to connect to in the iSNS server, but setting the target address information can be omitted. In this case, the iSNS server may be used in an ordinary method. Specifically, the storage device 200 registers information of each target (the iSCSI name and portal information) to the iSNS server, and each initiator registers its own information (iSCSI name and portal information) to the iSNS server. When accessing the target, the initiator acquires the information of one or more targets that can be read from the iSNS server, and attempts to access one or more targets according to that target information. Each of the one or more targets determines whether the access is from a registered initiator, that is an initiator having iSCSI name contained in the iSCSI settings data, and allows access if the access is from a registered initiator. In this way also an initiator can access the target that the initiator is to connect to. The ordinary usage method of the iSNS server is described in detail in the Internet Draft <draft-ietf-ips-isns-22.txt> managed by the IETF.

B. Second Embodiment

In the first embodiment, the manager investigated the initiator information, more specifically, the initiator iSCSI name and the initial value of the error recovery level for the initiator beforehand, but the present embodiment is devised so the manager can readily ascertain the initiator information.

Figure 11:
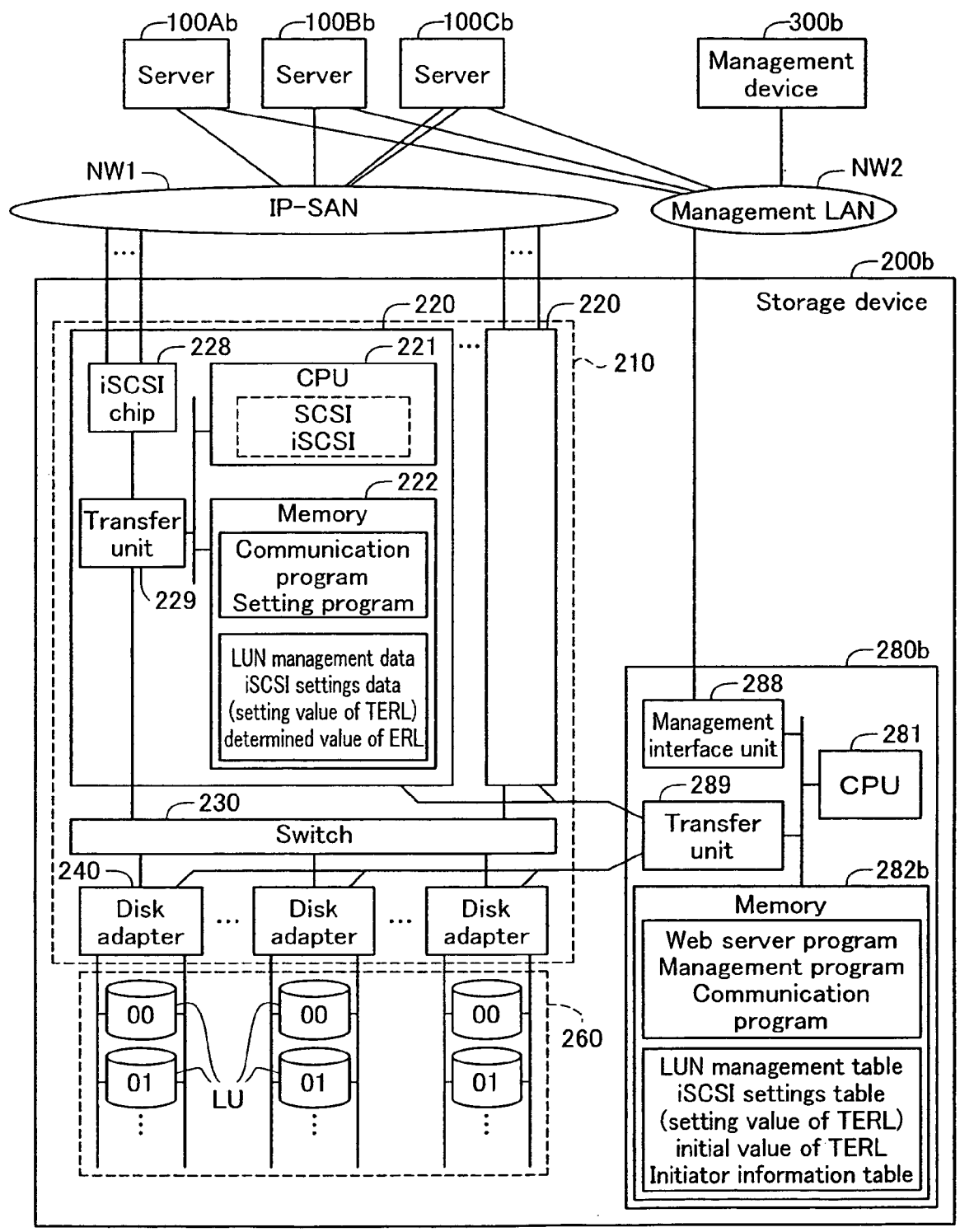
FIG. 11 is an explanatory view showing a detailed arrangement of a storage device 200b in the second embodiment.

FIG. 11 is an explanatory view showing a detailed arrangement of a storage device 200b in the second embodiment, and corresponds to FIG. 2. As illustrated, in this embodiment, an initiator information table is stored in a memory 282b of a storage management module 280b. Information for a plurality of initiators (servers) is registered in the initiator information table.

Figure 12:
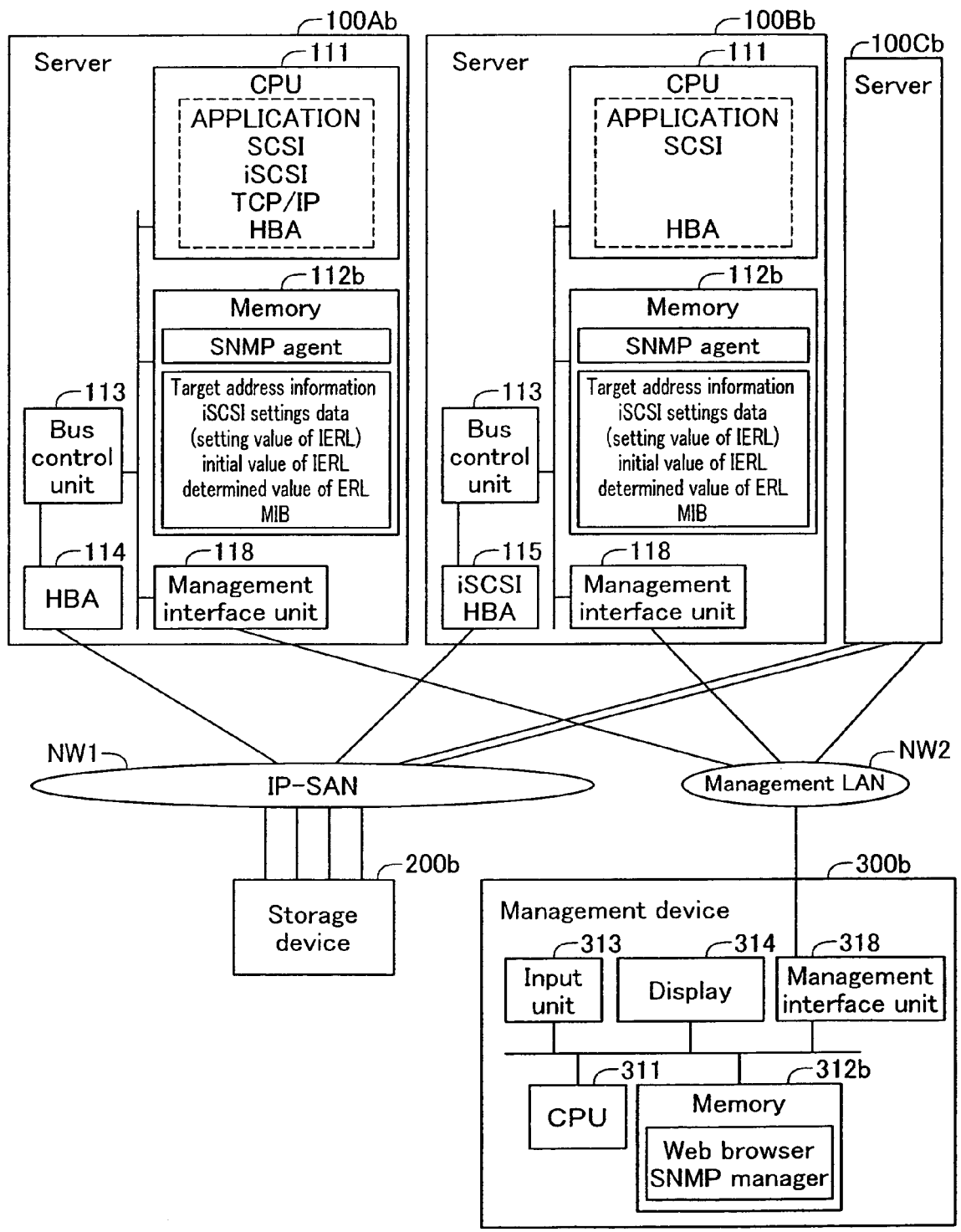
FIG. 12 is an explanatory view showing a detailed arrangement of servers 100Ab-100Cb and a management device 300b in the second embodiment.

FIG. 12 is an explanatory view showing a detailed arrangement of servers 100Ab-100Cb and a management device 300b in the second embodiment, and corresponds to FIG. 3. As illustrated, in this embodiment, an SNMP (Simple Network Management Protocol) manager program is stored in a memory 312b of the management device 300b. The SNMP is a protocol for monitoring devices connected to a network via the network. Also, an SNMP agent program and information showing the state of devices called MIB (Management Information Base) is stored in a memory 112b of the servers 100Ab-100Cb. The MIB includes information relating to implementation and operating status of the server.

The management device (SNMP manager) 300b of FIG. 12 acquires the MIB from each of the servers (SNMP agents) 100Ab-100Cb. Then, the management device provides the MIB acquired from each server to the storage management module 280b of the storage device 200b of FIG. 11. The storage management module 280b registers the information contained in the MIB of each sever to the initiator information table.

In this embodiment, the MIB contains the iSCSI name of the initiator and the setting value (same as the initial value) of the initiator level. The storage management module 280b can therefore acquire the information of each initiator, that is, the iSCSI name of the initiator and the setting value (initial value) of the initiator level beforehand through the management device 300b. As a result, the manager does not need to investigate the setting value (initial value) of the initiator level beforehand.

It should be noted that the storage management module 280b in this embodiment corresponds to the setting module in the present invention, and the storage management module 280b and the management device 300b correspond to an acquisition module and notification module of the present invention.

Figure 13:
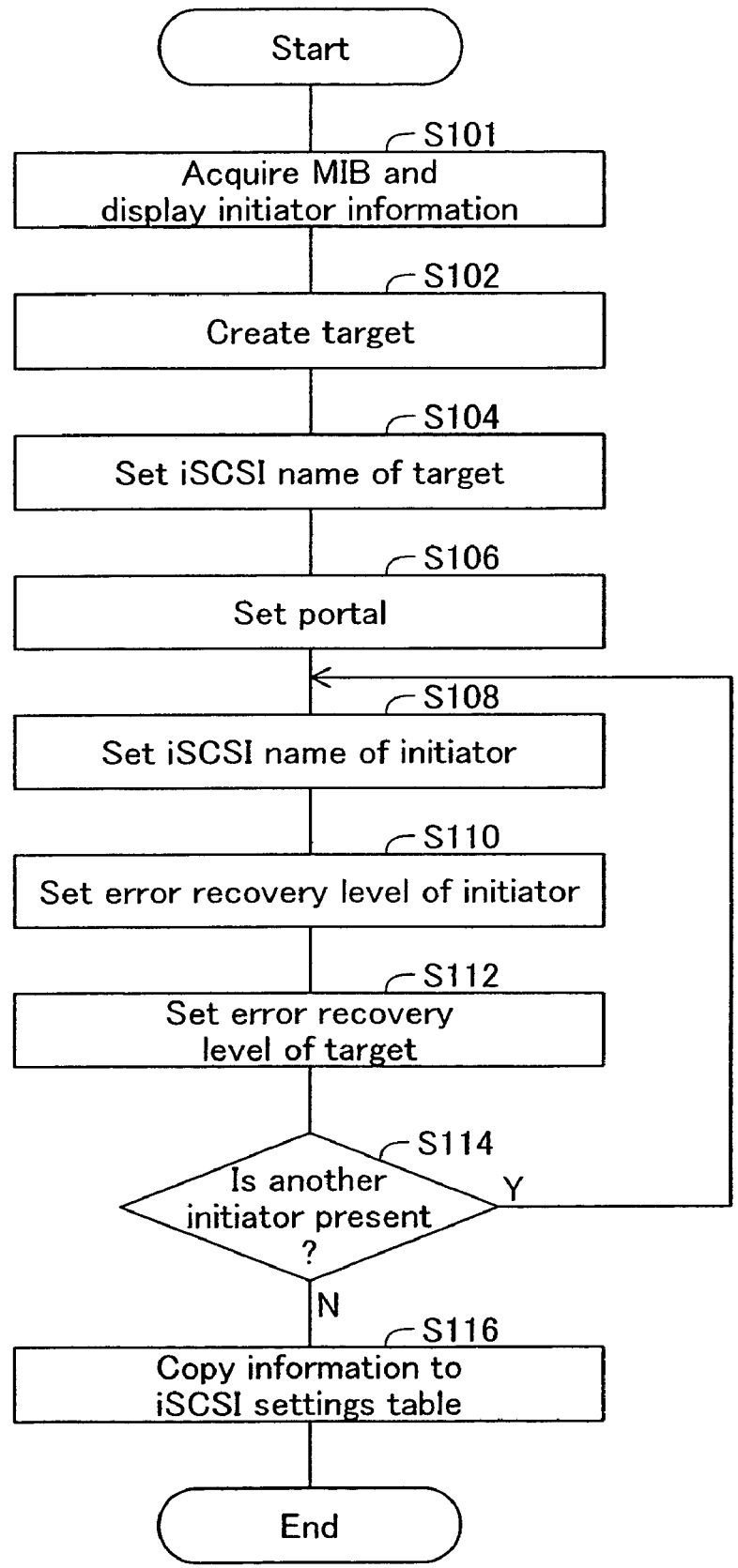
FIG. 13 is a flowchart showing procedure for setting correspondence between target and initiator in the second embodiment.

FIG. 13 is a flowchart showing the procedure for setting the correspondence between the target and initiator in the second embodiment. FIG. 13 is similar to FIG. 4, except a step S101 is added.

In step S101, the management program acquires the MIB of each server from the management device 300b and displays the initiator information on the management screen.

Figure 14:
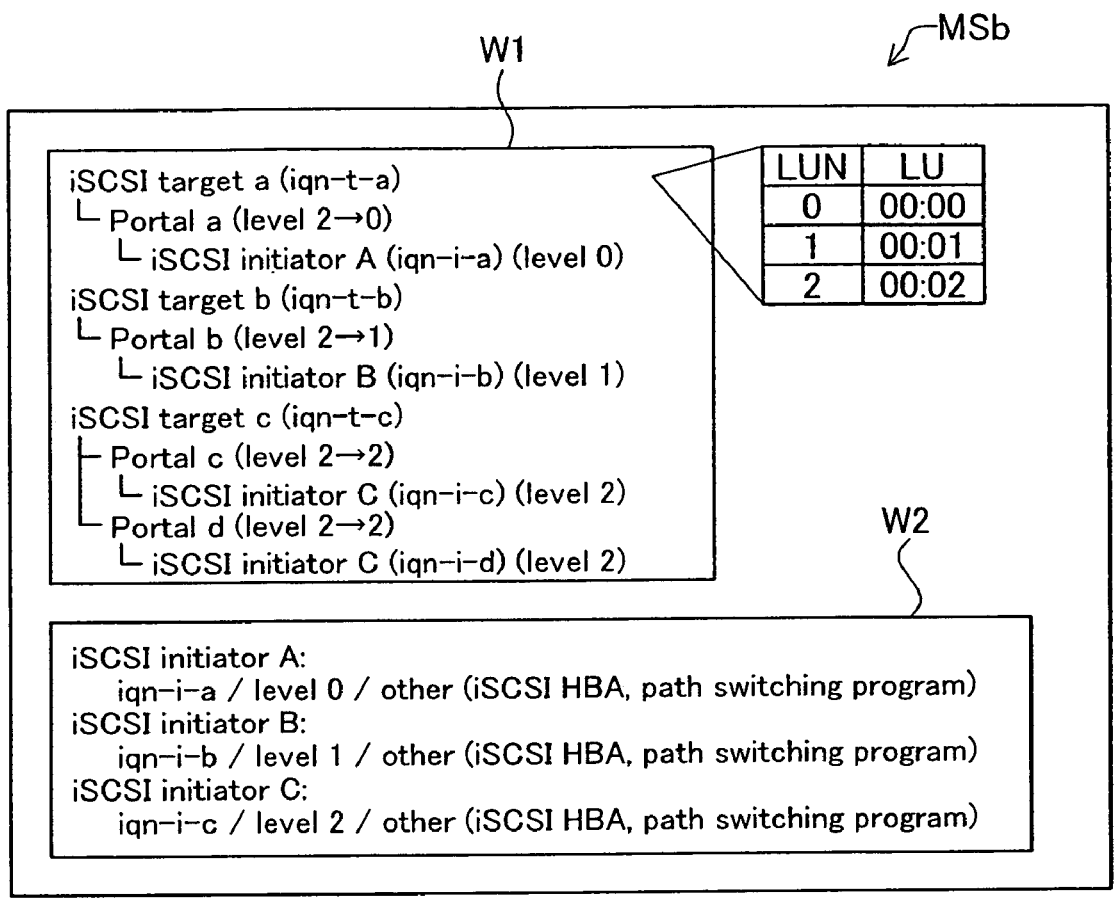
FIG. 14 is an explanatory view showing a management screen MSb displayed when setting the correspondence between the target and initiator.

FIG. 14 is an explanatory view showing a management screen MSb displayed when setting the correspondence between the target and the initiator. FIG. 14 is similar to FIG. 5, though an initiator information field W2 is included in the management screen in addition to the setting field W1. In the initiator information field W2, information including the iSCSI name of the initiator and the setting value (initial value) of the initiator is shown.

As described above, in this embodiment, the manager can easily ascertain the information of each initiator without an investigation beforehand. The manager can therefore easily set the iSCSI name of the initiator in step S108 as well as the initiator level in step S110. As a result, the manager can easily set the target level while referring to the setting value (initial value) of the initiator level in step S112.

Incidentally, in the second setting example described above, the target level is set according to the error checking performance of the server (initiator), more specifically, according to whether the server includes an iSCSI HBA. In this embodiment, the MIB contains the information of whether or not the server includes an iSCSI HBA, so the information of whether each initiator includes an iSCSI HBA or not is displayed in the initiator information field W2. As a result, the manager can easily ascertain the above information without an investigation beforehand, and can set the target level to a suitable level according to the initiator error checking performance.

Also, in the third setting example described above, the target level is set according to whether the server (initiator) includes a path switching program. In this embodiment, the MIB contains the information of whether or not the server includes a path switching program, so the information of whether each initiator (server) includes a path switching program or not is displayed in the initiator information field W2. As a result, the manager can easily ascertain the above information without an investigation beforehand, and can set the target level to a suitable value according to whether a path switching program is present.

Figure 15:
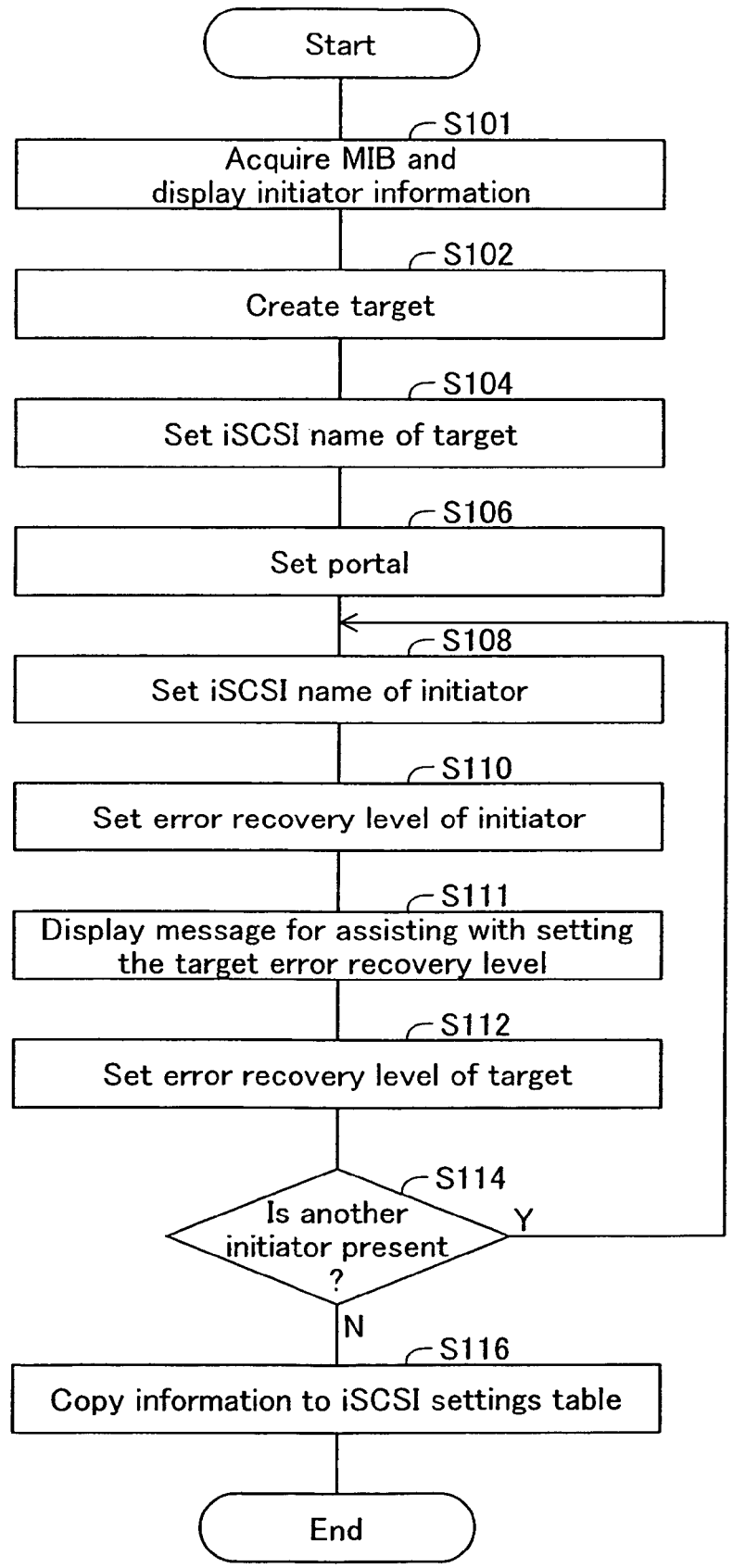
FIG. 15 is a flowchart showing procedure for setting correspondence between target and initiator in a modified example of the second embodiment.

B-1. Modification of the Second Embodiment:

FIG. 15 is a flowchart showing the procedure for setting the correspondence between the target and the initiator in a modified example of the second embodiment. FIG. 15 is similar to FIG. 13, though a step S111 is added before step S112.

In step S111, the management program displays a message for assisting with the manager's setting of the error recovery level of the target based on the initiator information acquired in step S101.

For example, if the error checking performance of the initiator is low, more specifically, if the initiator does not include an iSCSI HBA, the management program can provide the manager with a message whose gist is to set the target level smaller than the set value (initial value) of the initiator level. Also, if the server includes a path switching program, the management program can provide the manager with a message whose gist is to set the target level to "0" or "1". The manager can thereby easily set the target level to a suitable value, taking into consideration the contents of the message.

In this modified example, the management program provides a message, but instead of this, only a recommended value for the setting value of the target level may be provided. In general, assistance information for assisting the manager in changing the error recovery level value of the target may be notified.

The invention is not limited to the above examples and embodiments set forth hereinabove, and can be reduced to practice in various ways without departing from the spirit thereof, such as the following variations, for example.

(1) In the second embodiment, the management device comprises an SNMP manager program, but instead the storage management module may comprise an SNMP manager program. Also, the storage management module may acquire the MIB from each server through the second network NW2.

(2) In the second embodiment, changing only the error recovery level value of the target is allowed, but in addition to this, changing the error recovery value of the initiator may be allowed. Specifically, if the manager changes the error recovery level of the initiator in the management screen, the management program provides the changed setting value to the management device 300b, and instructs the management device 300b to change the setting value of the error recovery level of the initiator. Then, the management device (SNMP manager) provides the changed setting value to the server (SNMP agent), and causes the server to change the setting value of the initiator level in the MIB. The manager can thereby set the setting value of the error recovery level for the initiator to a value different from the initial value.

The storage management module and the management device in the above case correspond to a supply module in the present invention.

(3) In the above embodiments, the initial values of the error recovery levels for all the targets are set to "2", and changing of the error recovery level value for each target is allowed. However, if the initial value of the error recovery level for each target is different, changing of the error recovery level values of targets may not be allowed.

In this case as well, the manager can refer to the initial value of the target level displayed in the management screen. Accordingly, if the manager investigates the initial value of the initiator level beforehand, the manager can allocate an initiator having a suitable initiator level initial value selected from a plurality of initiators to a target, while taking into consideration the initial value of the target level.

In general, the error recovery level value of the target will be notified to the manager in the setting processing.

(4) In the above embodiments, the management device is provided external to the storage device, but the functions of the management device may be provided inside the storage device. Also, in the above embodiments, the storage management module is provided in the storage device, but the functions of the storage management module may be provided in the storage device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage system comprising:
a storage section containing a target module that functions as an iSCSI target and is connected to an initiator device functioning as an iSCSI initiator via a first network, and a logical unit that is accessed by the target module; and
a management section that manages the storage section, wherein the target module comprises:
a control module that carries out negotiation processing with the initiator device so as to determine a value of a first error recovery level for specifying contents of error recovery processing for recovering from a communication error between the initiator device and the target module, the first error recovery level being determined as the smaller of a value of a second error recovery level set to the initiator device and a value of a third error recovery level set to the target module,
wherein the management section comprises:
a setting module that carries out setting processing for allocating the initiator device that is to be connected to the target module to the target module, according to an instruction from a manager of the storage system, and
wherein the setting module comprises:
a notification module that notifies the manager of the value of the third error recovery level in the setting processing.

2. A storage system according to claim 1, wherein
the setting module allows the manager to change the value of the third error recovery level in the setting processing.

3. A storage system according to claim 2, wherein
the setting module further comprises an acquisition module that acquires the value of the second error recovery level from the initiator device via a second network, and
the notification module notifies the manager of the acquired value of the second error recovery level in the setting processing.

4. A storage system according to claim 3, wherein:
the acquisition module acquires function-related information related to a function of the initiator device from the initiator device via the second network, and
the notification module notifies the manager of the function-related information.

5. A storage system according to claim 4, wherein
the function-related information contains information related to a detection performance of communication errors in the initiator device.

6. A storage system according to claim 4, wherein
the function-related information contains information related to whether a switching program for switching a logical communication path between the initiator device and the target module is present.

7. A storage system according to claim 4, wherein the notification module notifies the manager of assistance information for assisting the manager in changing the value of the third error recovery level in response to the function-related information.

8. A storage system according to claim 7, wherein
the function-related information contains first information related to a detection performance of communication errors in the initiator device; and
the notification module, if the first information indicates that the detection performance of the initiator device is relatively low, notifies the manager of the assistance information that encourage the manager to set the value of the third error recovery level to a value smaller than the value of the second error recovery level.

9. A storage system according to claim 7, wherein
the function-related information contains second information related to whether a switching program for switching a logical communication path between the initiator device and the target module is present; and
the notification module, if the second information indicates that the switching program is present, notifies the manager of the assistance information that encourage the manager to set the value of the third error recovery level to 0 or 1.

10. A storage system according to claims 3, wherein
the setting module allows the manager to change the value of the second error recovery level in the setting processing; and
the setting module further comprises a supply module that supplies the initiator device with the changed value of the second error recovery level via the second network.

11. A network system comprising:
an initiator device; and
a storage system, the storage system comprising:
a storage section containing a target module that functions as an iSCSI target and is connected to the initiator device functioning as an iSCSI initiator via a first network, and a logical unit that is accessed by the target module; and
a management section that manages the storage section, wherein the target module comprises:
a control module that carries out negotiation processing with the initiator device so as to determine a value of a first error recovery level for specifying contents of error recovery processing for recovering from a communication error between the initiator device and the target module, the first error recovery level being determined as the smaller of a value of a second error recovery level set to the initiator device and a value of a third error recovery level set to the target module, wherein the management section comprises:

a setting module that carries out setting processing for allocating the initiator device that is to be connected to the target module to the target module, according to an instruction from a manager of the storage system, and wherein the setting module comprises:

a notification module that notifies the manager of the value of the third error recovery level in the setting processing.

12. A method of managing a storage device, wherein the storage device includes a target module that functions as an iSCSI target and is connected to an initiator device functioning as an iSCSI initiator via a first network, and a logical unit that is accessed by the target module, and wherein the target module includes a control module that carries out negotiation processing with the initiator device so as to determine a value of a first error recovery level for specifying contents of error recovery processing for recovering from a communication error between the initiator device and the target module, the first error recovery level being determined as the smaller of a value of a second error recovery level set to the initiator device and a value of a third error recovery level set to the target module, the method comprising:

carrying out setting processing for allocating the initiator device that is to be connected to the target module to the target module, according to an instruction from a manager of the storage system, wherein the carrying out setting processing comprises:

notifying the manager of the value of the third error recovery level in the setting processing.

13. A computer program product for causing a management device to manage a storage device, wherein the storage device includes a target module that functions as an iSCSI target and is connected to an initiator device functioning as an iSCSI initiator via a first network, and a logical unit that is accessed by the target module, and wherein the target module includes a control module that carries out negotiation processing with the initiator device so as to determine a value of a first error recovery level for specifying contents of error recovery processing for recovering from a communication error between the initiator device and the target module, the first error recovery level being determined as the smaller of a value of a second error recovery level set to the initiator device and a value of a third error recovery level set to the target module, the computer program product comprising;

a computer readable storage medium; and a computer program stored on the computer readable storage medium, the computer program comprising:

a first program configured to cause a data processing unit of the management device to allocate the initiator device that is to be connected to the target module to the target module, according to an instruction from a manager of the storage system, wherein the first program comprises:

a second program configured to cause a data processing unit of the management device to notify the manager of the value of the third error recovery level in the setting processing.

* * * * *